F. W. HAVERLEY.
LID FOR COOKING VESSELS.
APPLICATION FILED MAY 29, 1914.
1,123,285.
Patented Jan. 5, 1915.
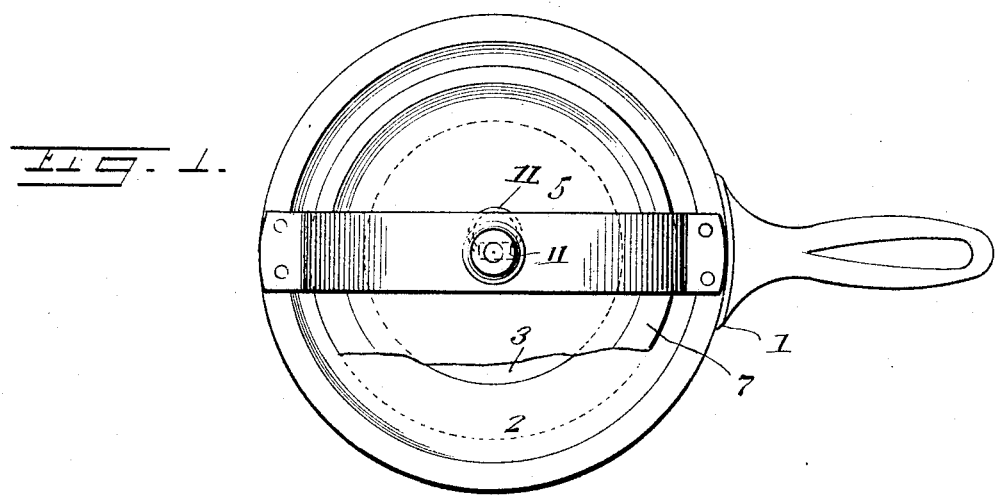
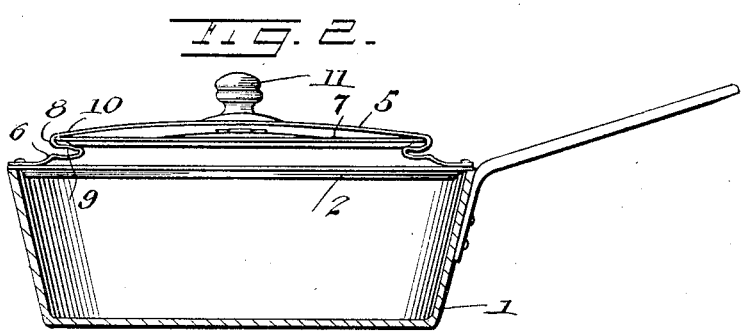
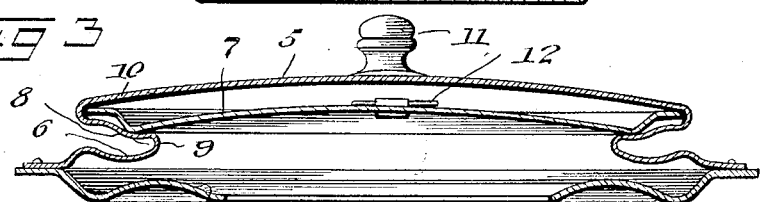
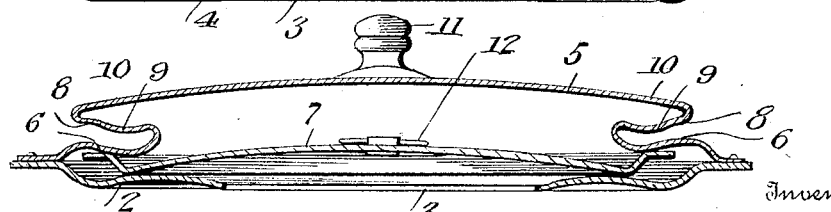
Inventor
F. W. Haverley
By Victor J. Evans
Attorney
Witnesses
C. C. Faunce
Dudley B. Howard

UNITED STATES PATENT OFFICE.

FOSTER W. HAVERLEY, OF COVINGTON, PENNSYLVANIA.

LID FOR COOKING VESSELS.

1,123,285.  Specification of Letters Patent.  Patented Jan. 5, 1915.

Application filed May 29, 1914. Serial No. 841,845.

*To all whom it may concern:*

Be it known that I, FOSTER W. HAVERLEY, a citizen of the United States, residing at Covington, in the county of Tioga and State of Pennsylvania, have invented new and useful Improvements in Lids for Cooking Vessels, of which the following is a specification.

This invention relates to lids for cooking vessels such as frying pans, kettles, and the like, the primary object being to provide a lid which includes readily adjustable sections, which are adapted to be arranged in superimposed relation to each other, the lower section being adapted to rest upon the upper edge of the cooking vessel and having a medial vent therein for the escape of steam, the top section being slightly larger in area than the vent in the lower section and being adapted to be supported in spaced relation to the other section in opened position or to bear directly upon the same in closed position. When the top section of the lid is in its closed position, the ordinary tight lid will be afforded, whereas, when the said section is secured in its elevated, opened position, the vent in the body section will be open so as to provide for the escape of steam or other volatile fluids, but the spattering of grease or the escape of any solid matter while being cooked will be prevented by the overlying top section.

A further object is to provide a device of this character which is extremely simple in construction so as to be inexpensive in cost of manufacture, and very light and durable.

The invention consists in the features of construction, combination, and arrangement of parts hereinafter fully described and claimed, reference being had to the accompanying drawings, in which:—

Figure 1 is a top plan view of the device in use upon a cooking vessel, a portion of the former being broken away, the top section being shown in its opened position; Fig. 2 is a side elevation of the same; Fig. 3 is a vertical sectional view taken through the lid alone with its top section in opened position; and Fig. 4 is a similar view showing the top section in its closed position.

In the drawings the numeral 1 designates a cooking vessel of an ordinary well-known type, upon the upper edge of which the body section 2 of the improved lid is adapted to rest. This lid section is provided medially with a large aperture 3, the portion of the lid marginal to the aperture being inclined downwardly toward the same so as to afford a draining surface 4 for a purpose which will be disclosed presently. A supporting member 5, which is formed from a single strip of resilient material, is secured to the upper face of the body section 2 adjacent to its outer edge and extends diametrically across the same. The outer portions of the member 5 overlie the section 2 at such a distance therefrom that yieldable jaws 6 are provided for use in securing the outer edges of a top section 7 in its lower-most, closed position, wherein it rests upon the body section of the lid as a support. This top section is similar in shape to the body section but is constructed smaller in diameter than the same, it being slightly larger than the vent opening 3 so as to overlie the same. Inwardly of the jaw portions 6 of the supporting member, the material from which it is formed is doubled back upon these portions in the form of folds 8, whereby sets of coacting spring jaws 9 and 10 are afforded for engagement with the outer edges of the top section to secure the same in its elevated, opened position above the vent opening in the body section. The closed position of the top section of the lid is shown particularly in Fig. 4, the opened position of the top section being shown in the preceding figures.

In order that the lid as a whole may be grasped conveniently when it is is desired to lift or transport the same while heated, a handle 11 of poor conducting material is provided upon the upper face of the supporting member 5, medially thereof. A manipulating handle 12, is also provided medially upon the top section of the lid in order that it may be operated independently of the body section.

When it is desired to have the ordinary tight lid, the top section is wedged between the body section and the lowermost jaws 6 of the supporting member into a position overlying and closing the vent opening 3 in the body section. When cooking certain food products and particularly at certain stages in such operations, it is essential that the steam or other volatile matter may escape freely from the cooking vessel. Ordinarily, the usual form of lid is partially removed from the top of the vessel so as to open a part of the same for this purpose. This practice is objectionable from the reason that grease and solid products are apt to escape and spatter over the stove or on to the floor or surrounding wood-work, whereby there is danger of the grease becoming ignited and of injury to the surfaces upon which it may fall. In the use of my device, however, by inserting the top section in its elevated position with its edges wedged securely between the yieldable jaws 9 and 10 of the supporting member, a proper vent will be provided medially in the body section of the lid, but any grease or other matter which may be ejected through the vent opening will strike the under surface of the top section and will be deflected onto the draining surface 4 so that it will return it to the cooking vessel without doing any damage.

What is claimed is:—

1. A lid of the class described comprising a body section having a medial vent opening therein, a top section adapted to overlie the vent opening in closed position, and a supporting member in the form of a diametrically extending strip of resilient material secured to the outer edges of the body section in superimposed relation thereto, the outer end portions of the strip being bent back to form outwardly projecting, upper-most folds affording yieldable jaws for the reception of the edges of the top section to secure the same in opened position spaced above the opening in the body section.

2. A lid of the class described comprising a body section having a medial vent opening therein, a top section adapted to overlie the vent opening in closed position. and a supporting member in the form of a diametrically extending strip of resilient material secured to the outer edges of the body section in superimposed relation thereto, the outer end portions of the strip being bent back to form outwardly projecting, upper-most folds affording yieldable jaws for the reception of the edges of the top section to secure the same in opened position spaced above the opening in the body section, the outer end portions of the supporting member also forming yieldable jaws adapted for engagement with the upper face of the top section in closed position to secure the same detachably to the body section.

3. A lid of the class described comprising a body section having a medial vent opening therein, a top section adapted to overlie the vent opening in closed position, a supporting member in the form of a diametrically extending strip of resilient material secured to the outer edges of the body section in superimposed relation thereto, the outer end portions of the strip being bent back to form outwardly projecting, upper-most folds affording yieldable jaws for the reception of the edges of the top section to secure the same in opened position spaced above the opening in the body section, and a handle provided upon the supporting member.

4. A lid of the class described comprising a body section having a medial vent opening therein, a top section adapted to overlie the vent opening in closed position, a supporting member in the form of a diametrically extending strip of resilient material secured to the outer edges of the body section in superimposed relation thereto, the outer end portions of the strip being bent back to form outwardly projecting, upper-most folds affording yieldable jaws for the reception of the edges of the top section to secure the same in opened position spaced above the opening in the body section, a handle provided upon the supporting member, and a handle provided upon the top section of the lid.

In testimony whereof I affix my signature in presence of two witnesses.

FOSTER W. HAVERLEY.

Witnesses:
 CHAS. C. REDFIELD,
 JOHN KENDRICK.

Copies of this patent may be obtained for five cents each, by addressing the "Commissioner of Patents, Washington, D. C."